United States Patent [19]
Lum et al.

[11] Patent Number: 5,726,682
[45] Date of Patent: Mar. 10, 1998

[54] PROGRAMMABLE COLOR SPACE CONVERSION UNIT

[75] Inventors: Sanford S. Lum, Scarborough; Keping Chen, Mississauga, both of Canada

[73] Assignee: ATI Technologies Inc., Thornhill, Canada

[21] Appl. No.: 612,431

[22] Filed: Mar. 7, 1996

Related U.S. Application Data

[63] Continuation of Ser. No. 118,631, Sep. 10, 1993, abandoned.
[51] Int. Cl.$^6$ ................................................. G09G 5/02
[52] U.S. Cl. .................................... 345/154; 348/661
[58] Field of Search ................................. 358/518, 519, 358/520; 348/453, 659, 660, 661, 644, 645–649, 650, 655; 345/153, 154, 155; 395/131

[56] References Cited

U.S. PATENT DOCUMENTS

| | | | |
|---|---|---|---|
| 4,853,768 | 8/1989 | Suzuki et al. | 358/519 |
| 5,233,410 | 8/1993 | Fairhurst | 348/645 |

OTHER PUBLICATIONS

"Coder/Recoder Units For RGB and NTSC Signals" by John D. Lowry pp. 945–948. Oct. 1981.

*Primary Examiner*—Richard Hjerpe
*Assistant Examiner*—Lun-Yi Lao
*Attorney, Agent, or Firm*—E. E. Pascal; R. A. Wilkes

[57] ABSTRACT

The present invention relates to a method of converting signal components of one of a first input three component color model signal and a second input three component color model signal to either one of the first or second three component color model comprised of matrix multiplying input signal components with an array of predetermined transformation parameters to form a multiplied set, vector adding the multiplied set with a predetermined group of offset vectors, whereby signal components of the output signal are produced.

9 Claims, 2 Drawing Sheets

PROGRAMMABLE COLOR SPACE CONVERSION UNIT

This is a continuation of application Ser. No. 08/118,631 filed Sep. 10, 1993, now abandoned.

FIELD OF THE INVENTION

This invention relates to computer systems for processing signals and in particular to a method and apparatus for converting color models within such systems.

BACKGROUND TO THE INVENTION

Computer systems which are required to process video signals with graphics, plural video signals, etc. typically display the signals on an RGB monitor, and often receive video signals using a different form of color model, such as YVU, which is the model transmitted from a TV station.

An RGB color model contains three component parts, one red, one green and one blue, each of which specify the intensity of an additive color component which forms a pixel.

In a YVU model, there are also three component parts, one of which specifies the intensity, and the other two channels specifying two color difference vectors. By combining the color difference vectors and the intensity, a pixel is formed. The Y, or intensity signal, is the signal displayed on a black and white television set.

Thus the RGB model is most suitable for the creation and display of color graphics on a computer monitor, while the YUV model is most suitable for transmission of television broadcasts in a manner compatible between black and white and color television sets.

When a video signal is to be manipulated in a computer, it is digitized. A digital standard CCIR-601 has been developed, which is referred to as the YCrCb model. The YCrCb model is similar to the YVU model, except that an offset is added to the color difference vector components to ensure that they are always positive (i.e. unsigned).

SUMMARY OF THE INVENTION

The present invention is a method and apparatus for converting and adjusting YCrCb signals to RGB signals, RGB signals to YCrCb signals, adjusting brightness, contrast, hue and tint in converting YCrCb input signals to other YCrCb output signals, adjusting brightness, contrast, hue and tint in converting RGB input signals to other RGB output signals, adjusting brightness, contrast, hue and tint in converting YCrCb signals to RGB signals, and adjusting brightness, contrast, hue and tint in converting RGB to YCrCb signals.

In accordance with an embodiment of the invention, a method and apparatus of converting signal components of one of an input RGB and YCrCb signal to either one of an output RGB and a YCrCb signal is comprised of matrix multiplying the input signal components with an array of predetermined transformation parameters to form a multiplied set, and vector adding the multiplied set with a group of predetermined offset vectors, whereby the signal components of the output signal are produced.

BRIEF INTRODUCTION TO THE DRAWINGS

A better understanding of the invention will be obtained by reference to the detailed description below, in conjunction with the following drawings, in which.

DETAILED DESCRIPTION OF THE PRESENT INVENTION

Figure 1:
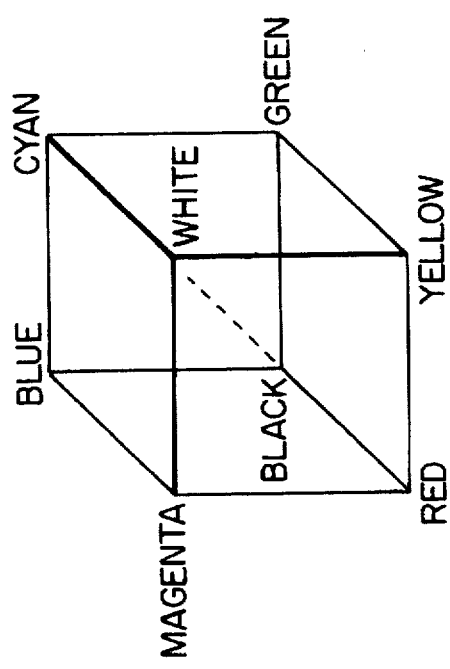
FIG. 1 illustrates an RGB color cube for illustrating the RGB model.

A color model is a specification of a three-dimensional color coordinate system and a three-dimensional subspace in the coordinate system wherein each color that can be displayed is represented by a point. An RGB color model may be represented by the subspace illustrated in FIG. 1, which is a cube. A color results from a contribution of each primary color shown at a vertex: blue, cyan, white, magenta, red, black, green and yellow. The three primary colors blue, green and red are additive, and form a resulting color. Grey levels are represented by the dashed line between the black and white vertices. In this manner any color may be represented.

On the other hand, cyan, magenta and yellow, the compliments of red, green and blue respectively, are referred to as subtractive primaries, because their effect is to subtract some color from white light. Colors are specified by what is removed or subtracted from the white vertex, rather than what is added to the black vertex. Subtractive colors are typically used in printing, wherein colored pigments are deposited onto paper.

The present invention provides a transformation between the intensity and two color difference vectors of the YCrCb model and the RGB model, vice versa, and between difference brightness, contrast, hue and tint levels of each model, for processing within a computer system.

Figure 2:
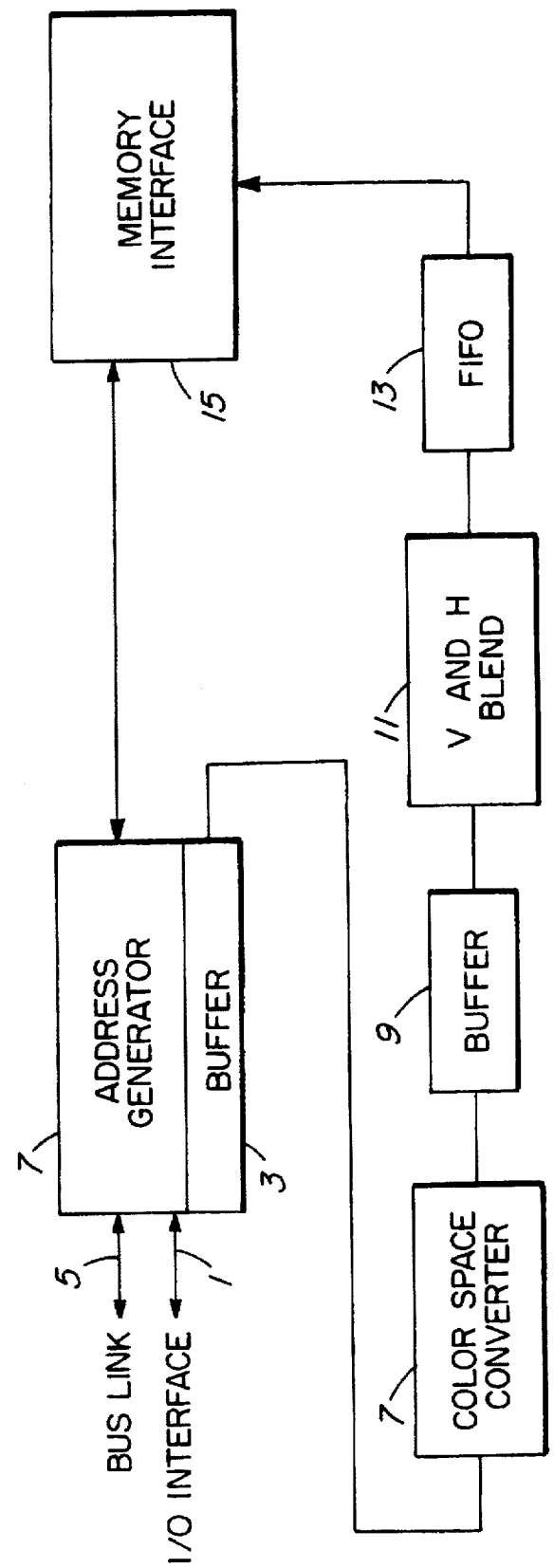
FIG. 2 is a block diagram of a portion of a video display processor incorporating a color space converter in accordance with the present invention.

FIG. 2 illustrates essential elements of a video display processor within a computer system. Video signals in either the RGB or YCrCb models are received or are transmitted by the I/O (input/output) interface 1. The signals are passed into a line buffer 3. A bus link 5 interfaces the remainder of the computer system, including for example a controlling microprocessor to an address generator 7. The buffer outputs input signals to a color space converter 7. The color space converter performs the conversion transformation described above, and outputs its signal to line buffer 9. Other operations such as vertical and horizontal blends are performed in a blender 11. The output of the blender 11 is applied to FIFO register 13, which outputs its content to memory interface 15, which can be video memory. Address generator 7 controls the locations where input signals from FIFO 13 are stored in a memory for display or for further processing, or for outputting back through I/O interface 1.

An input signal received from I/O interface 1 can be for example of YCrCb model form, and is to be blended with or otherwise processed with an RGB type of signal. Alternatively the input signal could be of YCrCb form and is to be blended with a YCrCb type signal. Another alternative is that either an RGB or YCrCb type of input signal is to be blended with the same type of signal and then output on I/O interface 1 for transmission to another device. Color space converter 7 performs the required conversions of one type of signal to the other, or varies the brightness, contrast, hue and/or tint adjustment in either of the signals.

It should be noted that the terms color saturation and tint may be used interchangeably, and color phase and hue may be used interchangeably below.

Figure 3:
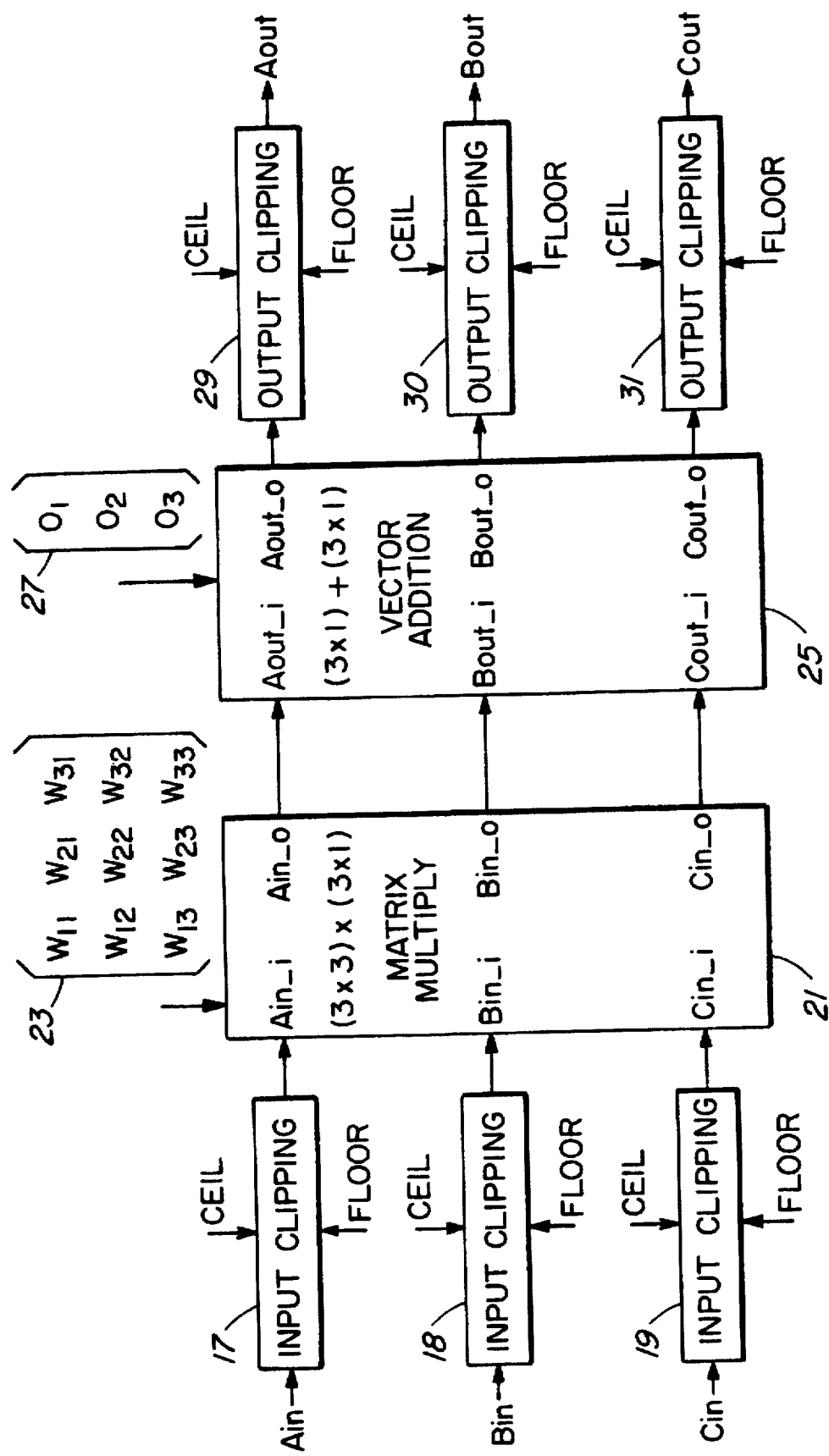
FIG. 3 is a block diagram of apparatus for implementing the present invention.

FIG. 3 illustrates apparatus for implementing color space conversion in color space converter 7, in accordance with a preferred embodiment.

The typically three input signal components $A_{in}B_{in}C_{in}$ of an input signal are applied to input clippers 17, 18 and 19 respectively. The input signals can be e.g. the RGB components of an RGB signal or the Y, Cr or Cb components respectively of a YCrCb signal.

Also applied to each of the clippers 17, 18 and 19 are ceiling and floor limit data signals or values which establish ranges within which the input signal components should be contained.

When the input signals exceed, either positively or negatively, the limits designated by the ceiling or floor values, the respective signal component is saturated (clipped) to the ceiling or floor (upward or downward limit) respectively.

The output signals of the clippers are applied to respective inputs of a matrix multiplier (matrix transformer) 21, in the preferred embodiment a [3×3]×[3×1] matrix multiplier. Also input to the multiplier is an array 23 of parameter data which forms a color transformation matrix. The transformation performed in the matrix multiplier will be described below.

The three outputs of the matrix multiplier 21 are applied to three inputs of a vector adder 25. A 3×1 array 27 of parameters is input to vector adder 25, which performs the function [3×1]+[3×1], as will be described below. The parameters 0× in the array 27 constitute offset vectors.

The three outputs of vector adder 25 are applied to respectively inputs of output clippers 29, 30 and 31 to which ceiling and floor limit data signals are applied. The output clippers operate similarly to the input clippers 17, 18 and 19, ensuring that the output signal components are contained within the range defined by the output ceiling and floor limits, and if the output signal components exceed those limits, they are clipped (saturated) to the ceiling and floor levels. The resulting output signals from clippers 29, 30 and 31, designated by $A_{out}$, $B_{out}$ and $C_{out}$ constitute the three components of the output signal in either RGB or YCrCb format.

In a preferred embodiment, each of the R, G and B signals are equal or greater to zero and equal or smaller than 255 units, the Y component is equal to or larger than 16 and equal or smaller than 235, and the Cr and Cb components are equal to or larger than 16, or equal to or smaller than 240.

To convert from YCrCb to RGB, the matrix multiplier 21 and vector adder 25 should perform the following transformation:

$R=1.1636*(Y-16)+1.6029*(Cr-128)$ $G=1.1636*(Y-16)-0.8165(Cr-128)-0.3935(Cb-128)$ $B=1.1636*(Y-16)+2.0261(Cb-128)$

To convert from RGB to YCrCb format, the multiplier and adder should perform the following transformations:

$Y=+0.2570R+0.5045G+0.0980B+16$ $Cr=0.4373R-0.3662G-0.0711B+128$ $Cb=-0.1476R-0.2897G+0.4373B+128$

For brightness, contrast, color saturation and hue control for a YCrCb signal, the input signal is YCrCb and the output is YCrCb, and the following transformations should be performed in the matrix multiplier and adder:

$Y=Y\_in*Contrast+Brightness$ $Cr=color\_sat*(cos(hue)*(Cr\_in-128)+sin(hue)*(Cb\_in-128))+128$ $Cb=color\_sat*(-sin(hue)*(Cr\_in-128)+cos(hue)*(Cb\_in-128))+128$ The conversion from a YCrCb to a RGB signal can be expressed in the following matrix form.

$$\begin{bmatrix} R \\ G \\ B \end{bmatrix} = \begin{bmatrix} 1.1636 & 1.6029 & 0.0000 \\ 1.1636 & -0.8165 & -0.3939 \\ 1.1636 & 0.0000 & 2.0261 \end{bmatrix} \begin{bmatrix} Y \\ Cr \\ Cb \end{bmatrix} + \begin{bmatrix} -223.8 \\ 136.3 \\ -278.0 \end{bmatrix}$$

or more precisely $$RGB = W_{r \to y} YCrCb + O_{r \to y}$$

where W is the color transformation matrix and O is the offset vector.

The matrix multiplication step is performed in the matrix multiplier 21 and the addition step is performed in the vector adder 25. The RGB elements constitute the values of the signal components in the input signal, and the numerical parameters in the 3×3 matrix constitute the $W_x$ transformation parameters, while the values in the 3×1 matrix constitute the offset vector O.

For conversion from an RGB to YCrCb format, the transformation that should be performed in the matrix multiplier and vector adder is $$\begin{bmatrix} Y \\ Cr \\ Cb \end{bmatrix} = \begin{bmatrix} 0.2570 & 0.5045 & 0.0980 \\ 0.4373 & -0.3662 & 0.0711 \\ -0.1476 & -0.2897 & 0.4373 \end{bmatrix} \begin{bmatrix} R \\ G \\ B \end{bmatrix} + \begin{bmatrix} 16 \\ 128 \\ 128 \end{bmatrix}$$

or more concisely $$YCrCb = W_{y \to r} RGB + O_{y \to r}$$

For brightness, contrast, color saturation and hue control in a YCrCb type signal, the input signal is YCrCb and the output signal is YCrCb. The matrix multiplier and vector adder should perform the following transformation.

$Y_{out}$ $Cr_{out} =$ $Cr_{out} =$ $$\begin{bmatrix} Contrast & 0.0000 & 0.0000 \\ 0.0000 & color\_sat*cos(hue) & color\_sat*sin(hue) \\ 0.0000 & -color\_sat*sin(hue) & color\_sat*cos(hue) \end{bmatrix} \begin{bmatrix} Y_{in} \\ Cr_{in} \\ Cb_{in} \end{bmatrix} +$$

$$\begin{bmatrix} Brightness \\ 128.*(1 - color\_sat*(cos(hue) + sin(hue))) \\ 128*(1 - color\_sat*(cos(hue) - sin(hue))) \end{bmatrix}$$

$$YCrCb_{out} = W_{y \to y} YCrCb_{in} + O_{y \to y}$$

In summary, for brightness, contrast, color saturation and hue control when converting from a YCrCb format to RGB, the transformation can be reduced to $$RGB = W_{y \to r}*(W_{y \to y}*YCrCb + O_{y \to y}) + O_{y \to r}$$

For brightness, contrast, color saturation and hue control when converting from an RGB signal to a YCrCb type signal, the following reduced transformation is performed.

$$YCrCb = W_{y \to y} * (W_{r \to y} * RGB + O_{r \to y}) + O_{y \to y}$$

For performing brightness, contrast, color saturation and hue control in an RGB signal, both the input and output signals are in RGB format. The transformation performed in the multiplier and vector adder in reduced form is $$RGB_{out} = W_{y \to r} * (W_{y \to y} * (W_{r \to y} * RGB_{in} O_{r \to y}) + O_{y \to y}) + O_{y \to r}$$

As noted above, the clippers 17 and 19 and 29–31 ensure that all data passing through them must be within the ranges specified. However if the input data is already between the specified ranges, the clippers may be deleted.

The three outputs of the matrix multiplier are respectively:

$$Ain\_o = Ain * W_{11} + Bin * W_{21} + Cin * W_{31}$$

$$Bin\_o = Ain * W_{12} + Bin * W_{22} + Cin * W_{32}$$

$$Cin\_o = Ain * W_{13} + Bin * W_{23} + Cin * W_{33}$$

The three outputs of the vector adder are $$Aout\_o = Aout\_i + o_1$$

$$Bout\_o = Bout\_i + o_2$$

$$Cout\_o = Cout\_i + o_3$$

All arithmetic is preferably performed on 10 bit wide signed integer data (1 bit sign, 1 bit integer and 8 bits fractional). This should be used under normal circumstances. However if over saturation, over contrast, or over brightness is desired, more integer bits may be required, increasing the number of total data bits and widening all other data paths. Floor and ceiling parameters on incoming and outgoing data channels are preferably 8 bits wide, and all other data paths are preferably 10 bits wide.

Preferred integer parameter sets for each respective operation are listed below. The dynamic range of Cr and Cb have been adjusted slightly such that all coefficients fall in the range (−512,+512).

For YCrCb to RGB conversion:

$$W_{y \to r} = \begin{bmatrix} 298/256 & 404/256 & 0 \\ 298/256 & -206/256 & -99/256 \\ 298/256 & 0 & 511/256 \end{bmatrix}$$

$$O_{y \to r} = \begin{bmatrix} -211 \\ 134 \\ -274 \end{bmatrix}$$

The floor and ceiling parameters for the clipping registers as shown in FIG. 3 preferably are:

| | |
|---|---|
| A_in_ceil | 235 |
| A_in_floor | 16 |
| B_in_ceil | 240 |
| B_in_floor | 16 |
| C_in_ceil | 240 |
| C_in_floor | 16 |
| A_out_ceil | 255 |
| A_out_floor | 0 |
| B_out_ceil | 255 |
| B_out_floor | 0 |
| C_out_ceil | 255 |
| C_out_floor | 0 |

-continued $$W_{r \to y} = \begin{bmatrix} 66/256 & 129/256 & 25/256 \\ 114/256 & -95/256 & -18/256 \\ -38/256 & -75/256 & 114/256 \end{bmatrix}$$

$$O_{r \to y} = \begin{bmatrix} 16 \\ 128 \\ 128 \end{bmatrix}$$

The floor and ceiling parameters for the clipping registers as shown in FIG. 3 preferably are:

| | |
|---|---|
| A_in_ceil | 255 |
| A_in_floor | 0 |
| B_in_ceil | 255 |
| B_in_floor | 0 |
| C_in_ceil | 255 |
| C_in_floor | 0 |
| A_out_ceil | 235 |
| A_out_floor | 16 |
| B_out_ceil | 240 |
| B_out_floor | 16 |
| C_out_ceil | 240 |
| C_out_floor | 16 |

For brightness, contrast, color saturation and hue control of YCrCb=>YCrCb:

$$W_{y \to y} = \begin{bmatrix} \text{Contrast} & 0 & 0 \\ 0 & color\_sat*\cos(hue) & color\_sat*\sin(hue) \\ 0 & -color\_sat*\sin(hue) & -color\_sat*\sin(hue) \end{bmatrix}$$

$$O_{y \to y} = \begin{bmatrix} \text{Brightness} \\ 128*(1 - color\_sat*(\cos(hue) + \sin(hue))) \\ 128*(1 - color\_sat*(\cos(hue) - \sin(hue))) \end{bmatrix}$$

The floor and ceiling parameters for the clipping registers as shown in FIG. 3 preferably are:

| | |
|---|---|
| A_in_ceil | 235 |
| A_in_floor | 16 |
| B_in_ceil | 240 |
| B_in_floor | 16 |
| C_in_ceil | 240 |
| C_in_floor | 16 |
| A_out_ceil | 235 |
| A_out_floor | 16 |
| B_out_ceil | 240 |
| B_out_floor | 16 |
| C_out_ceil | 240 |
| C_out_floor | 16 |

For brightness, contrast, color saturation and hue control of YCrCb=>RGB:

$$W = W_{y \to r} * W_{y \to y}$$

$$O = W_{y \to r} * O_{y \to y} + O_{y \to r}$$

The clipping registers are set as with straight YCrCB to RGB conversion.

For brightness, contrast, color saturation and hue control of RGB=>YCrCb:

$$W = W_{y \to y} * W_{r \to y}$$

$$o = W_{y \to y} * o_{r \to y} + o_{y \to y}$$

Clipping registers are set as with straight RGB to YCrCb conversion.

For brightness, contrast, color saturation and hue control in RGB=>RGB:

$$W=W_{y \rightarrow r} * W_{y \rightarrow y} * W_{r \rightarrow y}$$

$$O=W_{y \rightarrow r} * (W_{y \rightarrow y} * O_{r \rightarrow y} + o_{y \rightarrow y}) + O_{y \rightarrow r}$$

The floor and ceiling parameters for the clipping registers as shown in FIG. 3 preferably are:

| | |
|---|---|
| A_in_ceil | 255 |
| A_in_floor | 0 |
| B_in_ceil | 255 |
| B_in_floor | 0 |
| C_in_ceil | 255 |
| C_in_floor | 0 |
| A_out_ceil | 255 |
| A_out_floor | 0 |
| B_out_ceil | 255 |
| B_out_floor | 0 |
| C_out_ceil | 255 |
| C_out_floor | 0 |

It is preferred that all matrix multiplications should be performed in floating point and only converted to integer just before loading the coefficients to the hardware color conversion unit. This minimizes transformation error.

It should be noted that the input clipping parameters and output clipping parameters are preferably programmable. Thus any three component number set may be transformed into any other three component set as long as that transformation is linear. In particular, any three component color model may be transformed to any other three component color model as long as that transformation is linear. If the multipliers and data paths were widened, it would be practical to perform other useful transformations, such as xyz coordinate transformation for example.

A person understanding this invention may now conceive of alternative structures and embodiments or variations of the above. All of those which fall within the scope of the claims appended hereto are considered to be part of the present invention.

We claim:

1. A method of converting signal components of one of a first input three component color model and a second input three component color model to either one of said first or second three component color model comprising:

(a) providing input signal components in one of the first or second color models to an electronic processing means, (b) matrix transforming in said processing means said input signal components by multiplying said input signal components with signals representing an array of predetermined transformation parameters to form a transformed signal set, (c) vector adding in a vector adding means the transformed signal set with signals representing a predetermined group of offset vectors to produce signal components of an output signal, (d) clipping the input signal components to predetermined input amplitude ranges prior to the matrix transforming step, (e) the clipping step including saturating any input signal component to an upward or downward amplitude input limit prior to the matrix transforming step in the event said input signal component exceeds positively or negatively either of the upward or downward input amplitude limit respectively, (f) saturating any output signal component to an upward or downward output amplitude limit following the vector addition step in the event said output signal component exceeds positively or negatively either of the upward or downward output amplitude limit respectively, (g) in which the input signal component are R, G and B and the output signal components are Y, $C_r$ and $C_b$, and in which the matrix multiplying and adding steps convert the signal components according to the transformations:

$$Y=+0.2570.R+0.5045.G+0.0980.B+16$$

$$C_r=0.4373.R-0.3662.G-0.0711.B+128$$

$$C_b=0.1476.R-0.2897.G+0.4373.B+128$$

and wherein the matrixes are $$\begin{vmatrix} Y \\ C_r \\ C_b \end{vmatrix} = \begin{vmatrix} 0.2570 & 0.5045 & 0.0980 \\ 0.4373 & -0.3662 & 0.0711 \\ -0.1476 & -0.2897 & 0.4373 \end{vmatrix} \begin{vmatrix} R \\ G \\ B \end{vmatrix} + \begin{vmatrix} 16 \\ 128 \\ 128 \end{vmatrix}.$$

2. A method of converting signal components of one of a first input three component color model and a second input three component color model to either one of said first or second three component color model comprising:

(a) providing input signal components in one of the first or second color models to an electronic processing means, (b) matrix transforming in said processing means said input signal components by multiplying said input signal components with signals representing an array of predetermined transformation parameters to form a transformed signal set, (c) vector adding in a vector adding means the transformed signal set with signals representing a predetermined group of offset vectors to produce signal components of an output signal, (d) clipping the input signal components to predetermined input amplitude ranges prior to the matrix transforming step, (e) the clipping step including saturating any input signal component to an upward or downward amplitude input limit prior to the matrix transforming step in the event said input signal component exceeds positively or negatively either of the upward or downward input amplitude limit respectively, (f) saturating any output signal component to an upward or downward output amplitude limit following the vector addition step in the event said output signal component exceeds positively or negatively either of the upward or downward output amplitude limit respectively, (g) in which the first color model contains RGB signal components and the second color model contains YCrCb signal components, and the second color model contains YCrCb signal components, and (h) in which the input signal components are Y, $C_r$ and $C_b$, and the output signal components are R, G and B, and in which the matrix multiplying and adding step convert the signal components according to the transformations:

$$R=1.1636.(Y-16)+1.6029(C_r-128)$$

$G=1.1636.(Y-16)-0.8165(Cr-128)-0.3935(Cb-128)$ $B=1.1636.(Y-16)+2.0261(Cb-128)$ and wherein the matrixes are $$\begin{vmatrix} R \\ G \\ B \end{vmatrix} = \begin{vmatrix} 1.1636 & 1.6029 & 0.0000 \\ 1.1636 & -0.8165 & -0.3935 \\ 1.1636 & 0.0000 & 2.0261 \end{vmatrix} \begin{vmatrix} Y \\ Cr \\ Cb \end{vmatrix} + \begin{vmatrix} -223.8 \\ 136.3 \\ -278.0 \end{vmatrix}.$$

3. A method of converting signal components of one of a first input three component color model and a second input three component color model to either one of said first or second three component color model comprising:

(a) providing input signal components in one of the first or second color models to an electronic processing means, (b) matrix transforming in said processing means said input signal components by multiplying said input signal components with signals representing an array of predetermined transformation parameters to form a transformed signal set, (c) vector adding in a vector adding means the transformed signal set with signals representing a predetermined group of offset vectors to produce signal components of an output signal, (d) clipping the input signal components to predetermined input amplitude ranges prior to the matrix transforming step, (e) the clipping step including saturating any input signal component to an upward or downward amplitude input limit prior to the matrix transforming step in the event said input signal components exceeds positively or negatively either of the upward or downward input amplitude limit respectively, (f) saturating any output signal component to an upward or downward output amplitude limit following the vector addition step in the event said output signal component exceeds positively or negatively either of the upward or downward output amplitude limit respectively, (g) in which the input signal components are Y__in, Cr__in and Cb__in and the output signal components are Y, Cr and Cb an in which the matrix transforming and adding steps convert the signal components according to the transformations Y=Y__in*Contrast+Brightness Cr=color__sat*(cos(hue)*(Cr__in−128)+sin(hue)*(Cb__in−128))+128

Cb=color__sat*(−sin(hue)*(Cr__in−128)+cos(hue)*(Cb__in−128))+128 where color__sat is a signal representing a color saturation component of an input signal, hue is a signal representing a hue component of an input signal, and sin and cos are ratios.

4. A method of converting signal components of one of a first input three component color model and a second input three component color model to either one of said first or second three component color model comprising:

(a) providing input signal components in one of the first or second color models to an electronic processing means, (b) matrix transforming in said processing means said input signal components by multiplying said input signal components with signals representing an array of predetermined transformation parameters to form a transformed signal set, (c) vector adding in a vector adding means the transformed signal set with signals representing a predetermined group of offset vectors to produce signal components of an output signal, (d) clipping the input signal components to predetermined input amplitude ranges prior to the matrix transforming step, (e) the clipping step including saturating any input signal component to an upward or downward amplitude input limit prior to the matrix transforming step in the event said input signal component exceeds positively or negatively either of the upward or downward input amplitude limit respectively, (f) saturating any output signal component to an upward or downward output amplitude limit following the vector addition step in the event said output signal component exceeds positively or negatively either of the upward or downward output amplitude limit respectively, (g) in which the first color model contains RGB signal components and the second color model contains YCrCb signal components, and the second color model contains YCrCb signal components, and (h) in which the input signal components are Yin, Crin and Cbin and the output signal components are Y, Cr and Cb, and in which the matrix multiplying and adding steps convert the signal components according to the transformations:

$$\begin{bmatrix} Y_{out} \\ Cr_{out} \\ Cr_{out} \end{bmatrix} =$$

$$\begin{bmatrix} \text{Contrast} & 0.0000 & 0.0000 \\ 0.0000 & \text{color\_sat}*\cos(\text{hue}) & \text{color\_sat}*\sin(\text{hue}) \\ 0.0000 & -\text{color\_sat}*\sin(\text{hue}) & \text{color\_sat}*\cos(\text{hue}) \end{bmatrix} \begin{bmatrix} Y_{in} \\ Cr_{in} \\ Cb_{in} \end{bmatrix} +$$

$$\begin{bmatrix} \text{Brightness} \\ 128*(1-\text{color\_sat}*(\cos(\text{hue})+\sin(\text{hue}))) \\ 128*(1-\text{color\_sat}*(\cos(\text{hue})-\sin(\text{hue}))) \end{bmatrix}.$$

5. A method of converting signal components of one of a first input three component color model and a second input three component color model to either one of said first or second three component color model comprising:

(a) providing input signal components in one of the first or second color models to an electronic processing means, (b) matrix transforming in said processing means said input signal components by multiplying said input signal components with signals representing an array of predetermined transformation parameters to form a transformed signal set, (c) vector adding in a vector adding means the transformed signal set with signals representing a predetermined group of offset vectors to produce signal components of an output signal, (d) clipping the input signal components to predetermined input amplitude ranges prior to the matrix transforming step, (e) the clipping step including saturating any input signal component to an upward or downward amplitude input limit prior to the matrix transforming step in the event said input signal component exceeds positively or negatively either of the upward or downward input amplitude limit respectively, (f) saturating any output signal component to an upward or downward output amplitude limit following the vector addition step in the event said output signal component exceeds positively or negatively either of the upward or downward output amplitude limit respectively, (g) in which the first color model contains RGB signal components and the second color model contains YCrCb signal components, and the second color model contains YCrCb signal components, and (h) in which the input signal components are R, G and B and the output signal components are R, G and B, and in which the matrix multiplying and adding steps convert the signal components according to the transformation:

$$RGB_{out}=W_{y\rightarrow w}*(W_{y\rightarrow y}*(W_{r\rightarrow y}*RGB_{in}+o_{r\rightarrow y})+o_{y\rightarrow y})+o_{y\rightarrow w}$$

where $W_x$ are color transformation parameters and $o_x$ are a group of offset vectors.

6. A color space conversion unit comprising:

(a) means for receiving input signal components of one of an $RGB_{in}$ and $YcrCb_{in}$ signal, (b) an electronic processing means for matrix multiplying said signal components with an array of signals representing transformation parameters to form signals representing a transformed set, (c) a vector adder for vector adding, to the signals representing the transformed set, a group of signals representing offset vectors, to form output signal components of one of an output $RGB_{out}$ and a $YCrCb_{out}$ signal, (d) input clipping means for receiving each of the input components and for receiving input ceiling and floor limit parameter signals, for clipping each of any of said components that exceed positively or negatively said limits, to said limits, and for providing resulting input components as said input components to said electronic processing means, and (e) in which the input signal components are R, G and B and the output signal components are Y, $C_r$ and $C_b$, and in which the matrix multiplier and vector adder convert the signal components according to the transformations:

$$Y=+0.2570.R+0.5045.G+0.0980.B+16$$

$$C_r=0.4373.R-0.3662.G-0.0711.B+128$$

$$C_b=0.1476.R-0.2997.G+0.4373.B+128$$

and wherein the matrixes are $$\begin{vmatrix} Y \\ C_r \\ C_b \end{vmatrix} = \begin{vmatrix} 0.2570 & 0.5045 & 0.0980 \\ 0.4373 & -0.3662 & 0.0711 \\ -0.1476 & -0.2897 & 0.4373 \end{vmatrix} \begin{vmatrix} R \\ G \\ B \end{vmatrix} + \begin{vmatrix} 16 \\ 128 \\ 128 \end{vmatrix}.$$

7. A color space conversion unit comprising:

(a) means for receiving input signal components of one of an $RGB_{in}$ and $YCrCb_{in}$ signal, (b) an electronic processing means for matrix multiplying said signal components with an array of signals representing transformation parameters to form signals representing a transformed set, (c) a vector adder for vector adding, to the signals representing the transformed set, a group of signals representing offset vectors, to form output signal components of one of an output $RGB_{out}$ and a $YCrCb_{out}$ signal, (d) input clipping means for receiving each of the input components and for receiving input ceiling and floor limit parameter signals for clipping each of any of said components that exceed positively or negatively said limits, to said limits, and for providing resulting input components as said input components to said electronic processing means, and (e) in which the input signal components are Y, $C_r$ and $C_b$ and the output signal components are R, G and B, and in which the matrix multiplier and vector adder convert the signal components according to the transformations:

$$R=1.1636.(Y-16)+1.6029.(Cr-128)$$

$$G=1.1636.(Y-16)-0.8165(Cr-128)-0.3935(Cb-128)$$

$$B=1.1636.(Y-16)+2.0261(Cb-128)$$

and wherein the matrixes are $$\begin{vmatrix} R \\ G \\ B \end{vmatrix} = \begin{vmatrix} 1.1636 & 1.6029 & 0.0000 \\ 1.1636 & -0.8165 & -0.3935 \\ 1.1636 & 0.0000 & 2.0261 \end{vmatrix} \begin{vmatrix} Y \\ Cr \\ Cb \end{vmatrix} + \begin{vmatrix} -223.8 \\ 136.3 \\ -278.0 \end{vmatrix}.$$

8. A color space conversion unit comprising:

(a) means for receiving input signal components of one of an $RGB_{in}$ and $YCrCb_{in}$ signal, (b) an electronic processing means for matrix multiplying said signal components with an array of signals representing transformation parameters to form signals representing a transformed set, (c) a vector adder for vector adding, to the signal representing the transformed set, a group of signals representing offset vectors, to form output signal components of one of an output $RGB_{out}$ and a $YCrCb_{out}$ signal, (d) input clipping means for receiving each of the input components and for receiving input ceiling and floor limit parameter signals, for clipping each of any of said components that exceed positively or negatively said limits, to said limits, and for providing resulting input components as said input components to said electronic processing means, and (e) in which the input signal components are Y_in, Cr_in and Cb_in and the output signal components are Y, Cr and Cb and in which the matrix multiplier and vector adder convert the signal components according to the transformations:

Y=Yin*Contrast+Brightness

Cr=color_sat*(cos(hue)*(Cr_in-128)+sin(hue)*(Cb_in-128))+128

Cb=color_sat*(-sin(hue)*(Cr_in-128)+cos(hue)*(Cb_in-128))+128 where color_sat is a signal representing a color saturation component of an input signal, hue is a signal representing a hue component of an input signal, and sin and cos are ratios.

9. A color space conversion unit comprising:

(a) means for receiving input signal components of one of an $RGB_{in}$ and $YCrCb_{in}$ signal, (b) an electronic processing means for matrix multiplying said signal components with an array of signals representing transformation parameters to form signals representing a transformed set, (c) a vector adder for vector adding, to the signals representing the transformed set, a group of signals representing offset vectors, to form output signal components of one of an output $RGB_{out}$ and a $YCrCb_{out}$ signal, (d) input clipping means for receiving each of the input components and for receiving input ceiling and floor limit parameter signals, for clipping each of any of said components that exceed positively or negatively said limits, to said limits, and for providing resulting input components as said input components to said electronic processing means, and (e) in which the input signal components are R, G and B and the output signal components are R, G and B, and in which the matrix multiplier and vector adder convert the signal components according to the transformation:

$$RGB_{out}=W_{y \to r}*(W_{y \to y}*(W_{r \to y}*RGB_{in}+o_{r \to y})+o_{y \to y})+o_{y \to r}$$

where $W_x$ are color transformation parameters and $o_x$ are a group of offset vectors.

* * * * *